United States Patent
Han et al.

(10) Patent No.: US 9,382,136 B2
(45) Date of Patent: Jul. 5, 2016

(54) APPARATUS FOR GENERATING FINE BUBBLES HAVING A POSITIVE CHARGE AND WATER TREATMENT APPARATUS USING SAME

(75) Inventors: Moo Young Han, Seoul (KR); Tschung Il Kim, Seoul (KR)

(73) Assignee: SNU R&DB FOUNDATION, Seoul (KR)

( * ) Notice: Subject to any disclaimer, the term of this patent is extended or adjusted under 35 U.S.C. 154(b) by 0 days.

(21) Appl. No.: 14/122,200

(22) PCT Filed: Feb. 1, 2012

(86) PCT No.: PCT/KR2012/000794
§ 371 (c)(1),
(2), (4) Date: Nov. 25, 2013

(87) PCT Pub. No.: WO2012/161400
PCT Pub. Date: Nov. 29, 2012

(65) Prior Publication Data
US 2014/0083845 A1 Mar. 27, 2014

(30) Foreign Application Priority Data

May 26, 2011 (KR) .................. 10-2011-0050261
Dec. 30, 2011 (KR) .................. 10-2011-0147205

(51) Int. Cl.
*C02F 1/36* (2006.01)
*C02F 1/467* (2006.01)
(Continued)

(52) U.S. Cl.
CPC .............. *C02F 1/467* (2013.01); *B01F 3/0451* (2013.01); *B01F 3/0876* (2013.01); *B01F 5/0688* (2013.01); *B01F 11/0258* (2013.01); *C02F 1/36* (2013.01); *C02F 1/4678* (2013.01); *C02F 2209/42* (2013.01); *C02F 2303/04* (2013.01)

(58) Field of Classification Search
CPC ........ C02F 1/34; C02F 2303/04; C02F 1/467; C02F 1/36; C02F 1/461
USPC .................................................. 204/242, 273
See application file for complete search history.

(56) References Cited

U.S. PATENT DOCUMENTS

2008/0289971 A1* 11/2008 Shigihara et al. ............. 205/687

FOREIGN PATENT DOCUMENTS

CN         1392865 A       1/2003
JP      2000-325767 A     11/2000
(Continued)

OTHER PUBLICATIONS

English Translation of KR 20-2000-0024536 to Huh.*
(Continued)

*Primary Examiner* — Zulmariam Mendez
(74) *Attorney, Agent, or Firm* — Kinney & Lange, P.A.

(57) ABSTRACT

Provided is a water treatment apparatus using an apparatus for generating fine bubbles having a positive charge. The water treatment apparatus comprises: an apparatus for generating fine bubbles having a positive charge; a treatment bath into which the fine bubbles generated in the apparatus for generating fine bubbles are supplied and in which raw water is stored; and an ultrasonic oscillator for generating ultrasonic waves having a predetermined intensity when power is applied to explode the fine bubbles floating up to a water level after the fine bubbles are supplied into said treatment bath. Thus, germs attached to the fine bubbles may be sterilized by an exploding force generated when the fine bubbles are exploded.

13 Claims, 4 Drawing Sheets

(51) Int. Cl.
  *B01F 5/06* (2006.01)
  *B01F 11/02* (2006.01)
  *B01F 3/04* (2006.01)
  *B01F 3/08* (2006.01)

(56) References Cited

FOREIGN PATENT DOCUMENTS

| | | |
|---|---|---|
| JP | 2010-115594 A | 5/2010 |
| JP | 2010115594 A | 5/2010 |
| KR | 20-0223625 Y1 | 5/2001 |
| KR | 2002236250000 | 5/2001 |
| KR | 10-0355955 B1 | 10/2002 |
| KR | 20-0422442 Y1 | 7/2006 |
| KR | 100748580 B1 | 8/2007 |
| KR | 1020100052962 A | 5/2010 |
| KR | 1020120132709 A | 12/2012 |

OTHER PUBLICATIONS

English Translation of JP 2010-115594 to Yokota.*
International Search Report for PCT/KR2012/000794, completed Sep. 21, 2012.
Chinese Office Action dated Nov. 27, 2014 for corresponding Chinese Application No. 201280026178.2.

* cited by examiner

APPARATUS FOR GENERATING FINE BUBBLES HAVING A POSITIVE CHARGE AND WATER TREATMENT APPARATUS USING SAME

BACKGROUND

The present invention relates to an apparatus for generating fine bubbles having positive charges and a water treatment apparatus that sterilizes and disinfects treated water using the same.

In general, fine bubbles having a very small size of 1/100 mm to 1/1000 mm can be used as eco-friendly energy sources based only on water and air.

Unlike general bubbles, fine bubbles have a very small size of not more than 1 μm and microscopic bubbles have a size of not more than 50 μm.

As known in the art, when such fine bubbles having an ivory color contract and extinguish in water through continuous explosion while ascending at a very slow speed, impact waves including ultrasound waves of 40 kHz are generated and propagate at a speed of 400 km per hour together with large amounts of negative ions and instantaneous high heat, thereby providing various effects. Thus, various application techniques may be developed using such properties of fine bubbles.

Based on experimental results that fine bubbles can help blood circulation in the human body, it is recognized that hot springs using fine bubbles provide similar effects to water containing ozone, such as sterilization and activation of living things, and that fine bubbles can be applied to various fields, such as medical systems, heath facilities, food processing, agricultural water, fish farms, and the like.

Further, fine bubbles can remove various agricultural pesticides from vegetables and fruits when washing the vegetables and fruits, and can easily discharge waste from the skin of a user to maintain good skin conditions while massaging and relieving muscles of the user, enabling fatigue recovery.

Various types of fine bubble generation apparatuses for using various functions of fine bubbles are disclosed in the art.

Korean Patent No. 10-0748580 discloses a fine bubble generation apparatus, in which water filled in a water tank is introduced and discharged by a pump while a small amount of air is injected and compressed to high pressure, such that fine micrometer-scale bubbles can be generated due to friction while the air is exhausted into the water tank through a nozzle having pores.

Such a conventional fine bubble generation apparatus includes a pump for pumping and circulating water in a water tank, an air supply valve for supplying air to circulation water, a compression tank, and a special micro nozzle placed at an exhaust side and having pores, through which highly compressed water passes to generate a large amount of fine bubbles when discharged.

A water treatment method of removing particles from water by injecting fine bubbles is known in the art. For example, dissolved air flotation (DAF) is a water treatment method, by which fine bubbles are generated to induce collision between fine rising bubbles and floating or depositing particles in water such that agglomerates of the bubbles and the particles can be formed and removed from a water surface. DAF is used to remove particles having low densities such as algae and flocs in water and a floatation method is used to separate ores by blowing air.

According to the theory of particle collision in water, the most important factor for removing particles by injecting fine bubbles is electrostatic characteristics and sizes of particles and the electrostatic characteristics are most important.

Most particles in water are charged with negative ions, and fine bubbles injected in a conventional water treatment method are also charged with negative ions.

Thus, in the related art, since particles charged with negative ions and bubbles charged with negative ions collide with each other, there are problems of efficiency deterioration and excessive pretreatment.

Although some examples of artificial production of fine bubbles charged with positive charges using a surface absorbent as a chemical agent for enhancing water treatment efficiency are known in the art, use of the chemical agent such as the surface absorbent can provide drawbacks, such as contamination of drinking water or natural water, safety deterioration, and increase in treatment costs.

SUMMARY

The present invention has been made to solve such problems in the related art, and an aspect of the present invention is to provide a fine bubble generation apparatus that can generate a large amount of fine bubbles having positive charges to increase attractive force with foreign matter having negative charges.

Another aspect of the present invention is to provide a water treatment apparatus using fine bubbles having positive charges that can sterilize and disinfect foreign matter and germs contained in treated water using exploding force generated by explosion of fine bubbles.

In accordance with one aspect of the present invention, a fine bubble generation apparatus includes: an electrolysis bath having an anode plate and a cathode plate in an interior space, into which a predetermined amount of treated water is supplied, to electrolyze the treated water; and a mixing tank, to which the electrolyzed treated water is supplied in a pressurized state by a pump disposed at an intermediate portion of a water feeding pipe extending from the electrolysis bath, and to which air supplied through an air inflow control valve is supplied, the mixing tank being provided therein with a plurality of interior nozzles through which the treated water mixed with the air passes to form fine bubbles, wherein the treated water is discharged together with the fine bubbles having positive charges generated during electrolysis through an outlet of the mixing tank The interior nozzle may include a plurality of nozzle blocks separated at constant intervals from each other on an inner surface of the mixing tank, and at least one nozzle hole formed through each of the nozzle blocks such that a mixture of the treated water and the air passes through the nozzle hole.

The nozzle hole may be linearly or nonlinearly elongated in a discharge direction such that the mixture of the treated water and the air passing through the nozzle hole generates friction with the nozzle hole.

The air inflow control valve may be provided to an air inflow pipe connected to a treated water supply pipe to supply the treated water into the electrolysis bath, or provided to an air inflow pipe connected to a water feeding pipe connected to an inlet of the pump.

The cathode plate and the anode plate may be formed of one material selected from among iron, aluminum, and stainless steel.

In accordance with another aspect of the present invention, a water treatment apparatus includes: an apparatus for generating fine bubbles having positive charges; a treatment container to which fine bubbles generated by the fine bubble generation apparatus are supplied and in which a predetermined amount of raw water is stored; and an ultrasonic oscillator generating ultrasound waves having a predetermined intensity upon application of electric power such that the fine bubbles supplied into the treatment container and floating towards a water surface explode, wherein germs attached to the fine bubbles are sterilized and disinfected by exploding force generated by explosion of the fine bubbles.

The treatment container may be connected to a raw water supply pipe having a raw water inflow control valve.

The fine bubble generation apparatus may be connected to a circulation pipe connected to the treatment container such that the treatment water sterilized and disinfected in the treatment container is re-circulated and supplied to the fine bubble generation apparatus.

A storage container for receiving treated water sterilized and disinfected in the treatment container and storing a predetermined amount of the treated water may be disposed between the fine bubble generation apparatus and the treatment container.

The fine bubble generation apparatus may be connected to a raw water storage container storing a predetermined amount of raw water via a treatment water supply pipe, and the treatment water supply pipe may be connected to a circulation pipe connected to the treatment container.

The treatment container may be provided on a bottom surface thereof with a diffuser connected to a fine bubble supply pipe extending from the fine bubble generation apparatus to supply fine bubbles having positive charges to the treatment container.

The ultrasonic oscillator may be disposed at the same height as or at a different height than that of the diffuser such that fine bubbles having positive charges are supplied to the treatment container.

The water treatment apparatus may further include a controller controlling an operation timing of the fine bubble generation apparatus to generate fine bubbles having positive charges and an operation timing of the ultrasonic oscillator to generate ultrasound waves to be transferred to the fine bubbles having positive charges.

According to the present invention, since positive charges are generated by electrolyzing treated water supplied from outside and fine bubbles having positive charges are generated by passing treated water and air through an interior nozzle of a mixing tank such that foreign matter having negative charges can be attached to the fine bubbles and float on the water surface to be treated without chemical agents, thereby reducing water treatment costs while preventing contamination of water.

Further, since floating fine bubbles having positive charges can explode in water by providing ultrasound waves of a predetermined intensity to the fine bubbles to which germs such as bacteria and colon bacilli are attached, germs attached to the fine bubbles can be sterilized and disinfected by exploding force generated by explosion of the fine bubbles in the water.

DETAILED DESCRIPTION

Hereinafter, exemplary embodiments of the present invention will be described in more detail with reference to the accompanying drawings.

Figure 1:
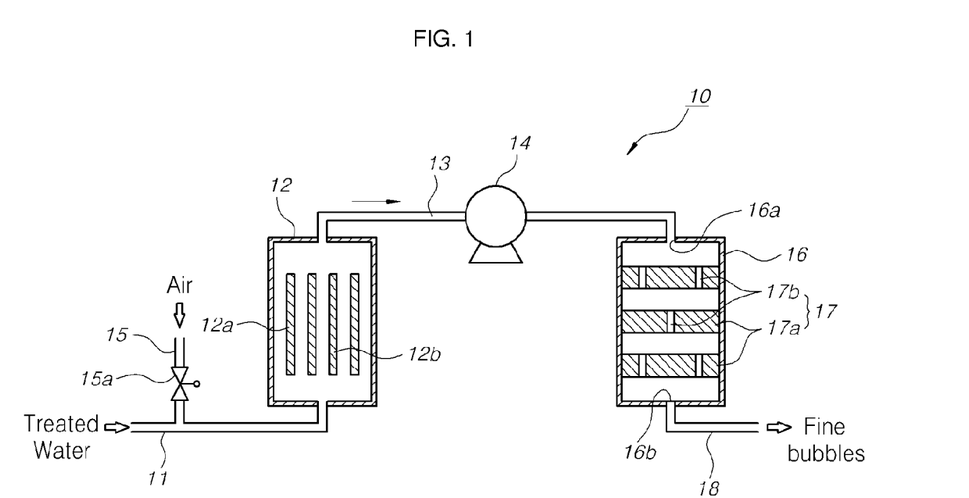
FIG. 1 is a schematic view of a fine bubble generation apparatus according to one exemplary embodiment of the present invention.

Referring to FIG. 1, a fine bubble generation apparatus 10 according to one exemplary embodiment includes an electrolysis bath 12, a pump 14, and a mixing tank 16.

The electrolysis bath 12 is provided therein with a plurality of anode and cathode plates 12a, 12b such that, when a predetermined amount of treated water is supplied to the electrolysis bath 12, the treated water can be electrolyzed to provide positive charges to the treated water.

The electrolysis bath 12 is connected at one end thereof to a treated water supply pipe 11, and at an opposite end thereof to a water feeding pipe 13 for supplying the treated water to the pump 14.

The anode and cathode plates 12a, 12b are constituted by a plurality of metal plates which are parallel in a supply direction of treated water and are separated at constant intervals from each other, and to which voltage is applied from outside. The anode and cathode plates 12a, 12b are provided within the electrolysis bath 12.

The cathode plates 12a are connected to a cathode side of an external power source and generate hydrogen gas through electrolysis of water in the electrolysis bath, and the anode plates 12b are connected to an anode side of the power source and supply positive ions to the gas generated from the cathode plate.

For this purpose, the electrode plates 12a may be formed of anyone selected from among iron, aluminum, or stainless steel.

That is, when voltage is applied from the external power source to the anode plates and the cathode plates separated at constant intervals from each other such that positive voltage is applied to the anode plates and negative voltage is applied to the cathode plates, hydrogen gas is generated from the cathode plates formed of aluminum and positive charges are discharged from the anode plates, thereby providing the positive charges to the water to be treated.

Thus, when the anode plates are formed of iron, electrolysis occurring on the anode plates can be represented by Formula 1.

$$Fe \rightarrow Fe^{2+} + 2e-$$

$$Fe^{2+} \rightarrow Fe^{3+} + e-$$

$$Fe^{3+} + 3OH^- \rightarrow Fe(OH)_3 \downarrow \qquad \text{<Formula 1>}$$

When the anode plates are formed of aluminum, electrolysis occurring on the anode plates can be represented by Formula 2.

$$Al \rightarrow Al^{3+} + 3e-$$

$$Al^{3+} + 3OH- \rightarrow Al(OH)_3 \downarrow \qquad \text{<Formula 3>}$$

When voltage is applied to the anode plates, metal ions (iron ions and aluminum ions) having a positive potential is discharged from the anode plates and an insoluble metal hydroxide (iron hydroxide, aluminum hydroxide, and the like) is produced. Since the produced metal hydroxide has a higher specific gravity than that of water, the metal hydroxide is slowly deposited on the electrolysis bath.

Electrolysis occurring on the cathode plate can be represented by Formula 3.

$$2H+ + 2e^- \rightarrow H_2 \uparrow \qquad \text{<Formula 3>}$$

When voltage is applied to the cathode plates, hydrogen gas is discharged therefrom.

The mixing tank 16 is connected to the pump 14 via the water feeding pipe 13 extending from the electrolysis bath 12 such that the electrolyzed water can be supplied in a pressurized state by the pump 14 disposed at an intermediate portion of the water feeding pipe 13.

When an air inflow control value 15a provided to an air inflow pipe 15 is opened, exterior air is supplied into the mixing tank 16 through the air inflow pipe 15, while the treated water is supplied into the mixing tank. The mixing tank 16 is provided therein with at least one interior nozzle 17 through which a mixture of the external air and the treated water passed to generate fine bubbles.

Although the air inflow control valve 15a is illustrated as being provided to the air inflow pipe 15 connected to the treated water supply pipe 11, the present invention is not limited thereto. Alternatively, the air inflow control valve 15a may be connected to the air inflow pipe 15, which is connected to the water feeding pipe 14 connected to an inlet of the pump 14, to supply exterior air to the water feeding pipe 14 that supplies the treated water having positive charges.

The mixing tank 16 includes an inlet port 16a for introducing a mixture of treated water fed from the pump 14 and air, and an outlet port 16b for discharging fine bubbles having positive charges and generated while passing through the interior nozzle 17.

The interior nozzle 17 includes a plurality of nozzle blocks 17a disposed on an inner surface of the mixing tank 16 to be separated at constant intervals from each other, and at least one nozzle hole 17b such as an orifice formed in each of the nozzle blocks 17a such that the mixture of treated water and air passes through the nozzle hole 17b.

The nozzle holes 17b formed through the nozzle blocks 17a may have a linearly or non-linearly elongated shape in a discharge direction to in order to increase the amount of the fine bubbles generated by inducing friction with the mixture of treated water and air while further reducing the size of the fine bubbles.

The diameter and the number of nozzle holes 17b formed in each of the nozzle blocks 17a may be selected dependent upon pressure of the mixture passing through the nozzle holes 17b.

Accordingly, the pressurized mixture of air and the treated water introduced into the mixing tank 16 through the inlet port 16a of the mixing tank 16 passes at a high speed through the nozzle holes 17b of the nozzle blocks 17a to be discharged through the outlet 16b of the mixing tank 16.

Here, as the mixture supplied into the mixing tank approaches the outlet 16b of the mixing tank, the mixture has an increasing flow rate, and a rapidly decreasing fluid pressure between adjacent nozzle blocks 17a.

In this way, a greater number of fine bubbles is generated from the outlet 16b by further reducing the size of the bubbles generated when the air contained in the treated water passes through the nozzle due to very rapid reduction in fluid pressure while the mixture of the treated water and the air is discharged from the mixing tank 16.

As the treated water having positive charges is supplied into the mixing tank 16, positively charged fine bubbles are generated through the outlet 16b of the mixing tank 16.

That is, the treated water electrolyzed in the electrolysis bath 12 through operation of the pump 14 is fed into the inlet port 16a of the mixing tank 16 through the water feeding pipe 13, and a highly turbulent mixing area is generated behind the nozzle holes 17b while the mixture of the air and the treated water supplied into the mixing tank 16 passes through the nozzle holes 17b of the nozzle blocks 17a.

Since turbulent flow generated in the mixing area entails a severe pressure change and a jet stream has low pressure, negative pressure areas having lower pressures than atmospheric pressure are formed. Under this condition, bubbles are generated whenever an abrupt pressure drop occurs, and more and smaller fine bubbles are generated as the mixture passes through the plurality of nozzle blocks.

Then, the fine bubbles discharged through the outlet of the mixing tank are positively charged during electrolysis in the electrolysis bath, so that the positively charged fine bubbles are supplied through a bubble supply line 18 to be used.

Figure 2:
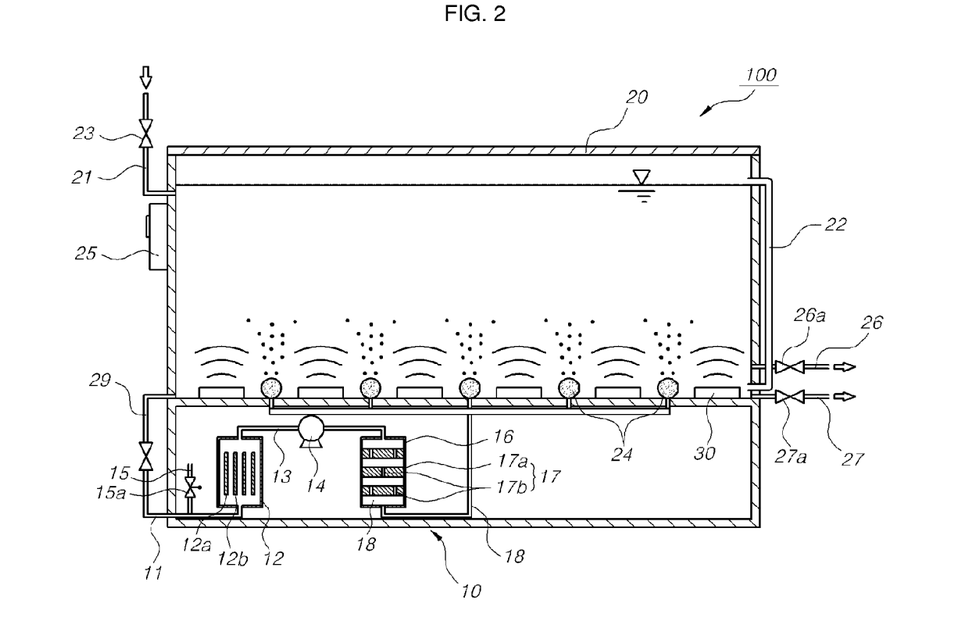
FIG. 2 is a schematic view of a water treatment apparatus using a fine bubble generation apparatus according to a first embodiment of the present invention.

FIG. 2 is a schematic view of a water treatment apparatus using an apparatus for generating fine bubbles having positive charges according to a first embodiment of the present invention.

Referring to FIG. 2, the water treatment apparatus 100 according to this embodiment includes a fine bubble generation apparatus 10, a treatment container 20, and an ultrasonic oscillator 30.

The fine bubble generation apparatus 10 has the same structure as described above, and thus, detailed descriptions thereof will be omitted and the same components will be denoted by the same reference numerals.

The treatment container 20 may include a box-shaped container structure to which fine bubbles having positive charges generated by the fine bubble generation apparatus 10 are supplied and in which a predetermined amount of raw water to be sterilized and disinfected is filled.

The treatment container 20 is connected to a raw water supply pipe 21 having a raw water inflow control valve 23 such that a predetermined amount of raw water is supplied into the treatment container through the raw water supply pipe 21, and may include a water gauge 22 for measuring a level of the raw water in the treatment container 20.

The treatment container 20 is provided at a bottom surface thereof with a diffuser 24, which is connected to a fine bubble supply pipe extending from the fine bubble generation apparatus 10 to supply fine bubbles having positive charges, such that the fine bubbles having positive charges float from the bottom surface of the treatment container 20 towards a water surface.

Accordingly, foreign matter, bacteria, and germs contained in the raw water filling the treatment container 20 can be attached to the fine bubbles having positive charges and float together with the bubbles to the water surface by floating force.

The treatment container 20 includes a drinking water discharge pipe 26 having a control valve 26a such that sterilized and disinfected drinking water can be discharged for a user, and a drain pipe 27 having a control valve 27a such that remaining raw water can be discharged outside.

The ultrasonic oscillator 30 provides ultrasound waves having a predetermined intensity into the treatment container upon application of electric power such that the ultrasound waves can be transferred to fine bubbles supplied through the diffuser disposed on the bottom surface of the treatment container 20 and floating towards the water surface, whereby the fine bubbles can explode in the water before reaching the water surface.

Although the ultrasonic oscillator 30 is illustrated as being disposed at the same height as that of the diffuser 24 on the bottom surface of the treatment container 20, the present invention is not limited thereto. Alternatively, the ultrasonic oscillator 30 may be disposed at a location spaced apart from the bottom surface of the treatment container 20 by a predetermined height to be disposed at a different height than that of the diffuser 24.

The fine bubble generation apparatus 10 is connected to a circulation pipe 29 connected to the treatment container 20 to re-circulate and supply the treated water sterilized and disinfected by the treatment container 20.

The water treatment apparatus 100 includes a controller 25 that controls an operation timing of the fine bubble generation apparatus to generate fine bubbles having positive charges and an operation timing of the ultrasonic oscillator to transfer ultrasound waves to the fine bubbles having positive charges so as not to overlap each other.

Figure 3:
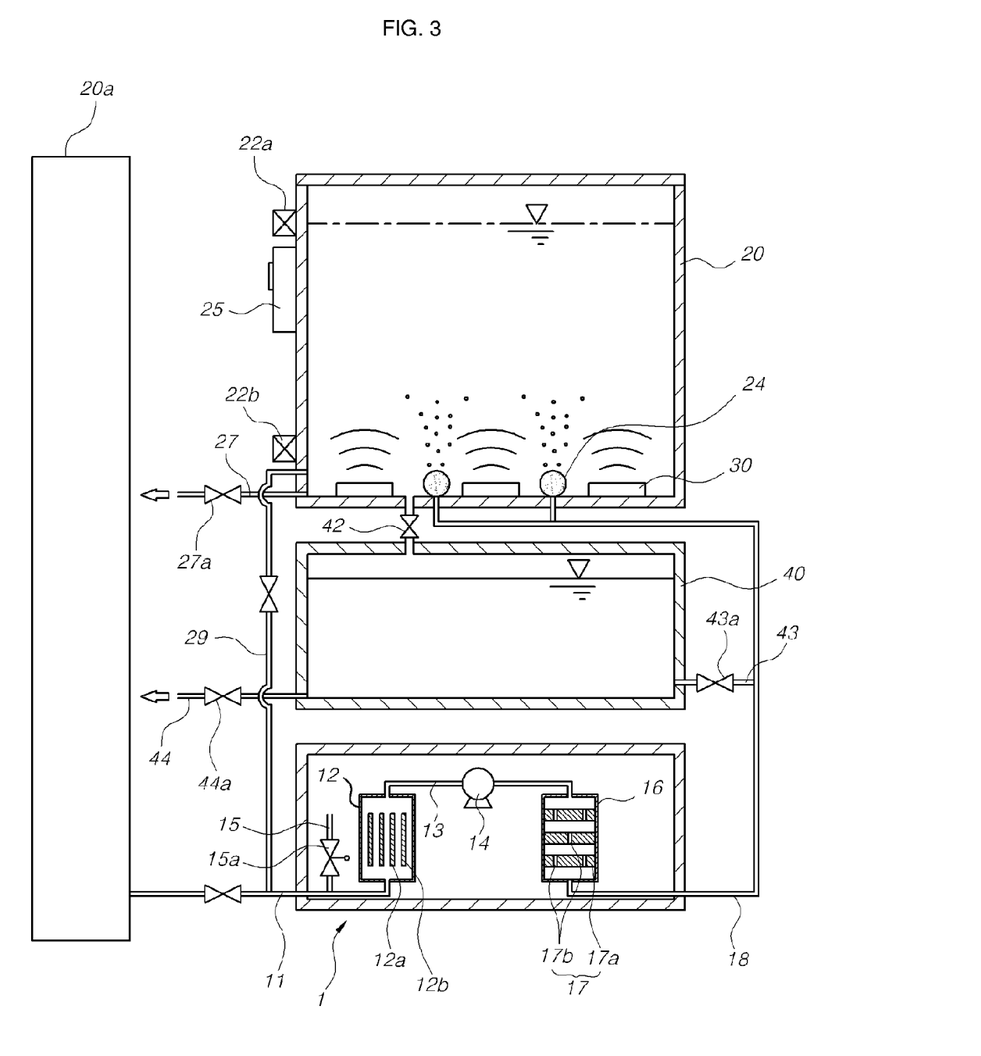
FIG. 3 is a schematic view of a water treatment apparatus using a fine bubble generation apparatus according to a second embodiment of the present invention.

FIG. 3 is a schematic view of a water treatment apparatus using an apparatus for generating fine bubbles having positive charges according to a second embodiment of the present invention.

Referring to FIG. 3, a water treatment apparatus 100a according to this embodiment includes a fine bubble generation apparatus 10, a treatment container 20, and an ultrasonic oscillator 30. The same components as those of the first embodiment will be denoted by the same reference numerals, and detailed descriptions thereof will be omitted.

A storage container 40 for receiving treatment water sterilized and disinfected by the treatment container 20 and storing a predetermined amount of treatment water may be disposed between the fine bubble generation apparatus 10 and the treatment container 20. The storage container 40 includes a drinking water discharge pipe 43 having a control valve 43a such that sterilized and disinfected drinking water can be discharged for a user, and a drain pipe 44 having a control valve 44a such that remaining raw water can be discharged outside The treatment container 20 may include water level sensors 22a, 22b for detecting a maximum water level and a minimum water level of the raw water therein.

As in the first embodiment, the treatment container 20 is provided at the bottom surface thereof with a diffuser 24, which is connected to a fine bubble supply pipe 18 extending from the fine bubble generation apparatus 10 to supply fine bubbles having positive charges, and with the ultrasonic oscillator 30, which generates ultrasound waves having a predetermined intensity upon application of electric power 30 such that the ultrasound waves can be transferred to the fine bubbles supplied through the diffuser.

The diffuser 24 and the ultrasonic oscillator 30 may be disposed at the same height or different heights from the bottom surface of the treatment container 20.

The fine bubble generation apparatus 10 is connected to a raw water storage container 20a, which contains a predetermined amount of raw water, via a treated water supply pipe 11, which is connected to a circulation pipe 29 connected to the treatment container 20.

Accordingly, raw water stored in the raw water storage container or treated water stored in the treatment container may be selectively supplied to the fine bubble generation apparatus 10.

In a process of sterilizing and disinfecting germs such as bacteria contained in raw water via the water treatment apparatus 100 or 100a using fine bubbles having positive charges, first, when raw water to be sterilized and disinfected reaches a maximum water level in the treatment container 20, the fine bubbles having positive charges are supplied into the treatment container 20 through the bubble supply pipe and the diffuser for a predetermined period of time by operation of the fine bubble generation apparatus 10.

In this case, the fine bubbles discharged from the diffuser 24 float towards the water surface. Then, since the fine bubbles have positive charges, the bubbles float towards the water surface together with germs such as bacteria or colon bacilli having negative charges, as shown in FIG. 4.

Figure 4:
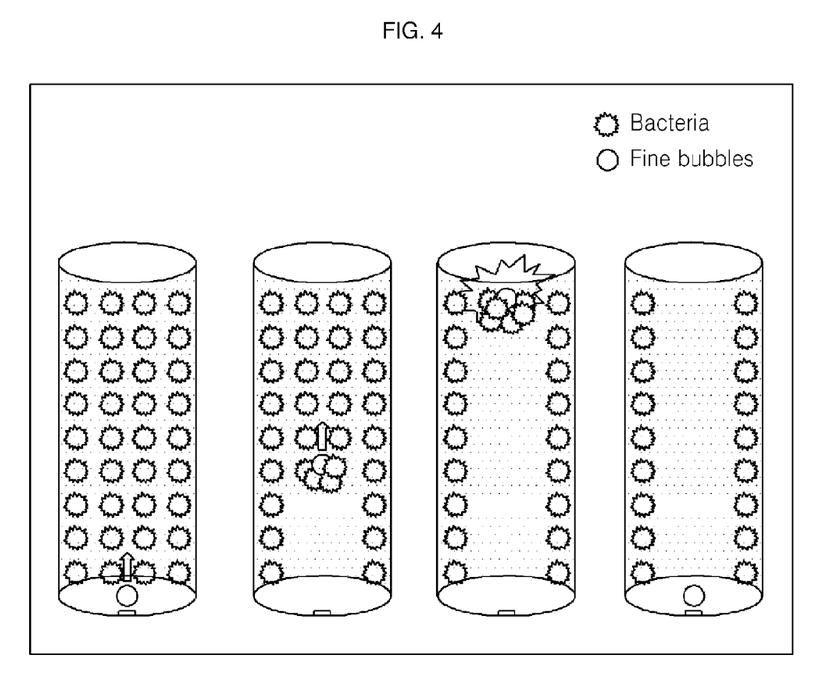
FIG. 4 is a schematic view of a sterilizing process through explosion of fine bubbles.

When ultrasound waves having a predetermined intensity are generated through operation of the ultrasonic oscillator 30 disposed in the treatment container 20 and are transferred to the floating fine bubbles, the fine bubbles are exploded by the ultrasound waves, as shown in FIG. 4, and the germs attached to the fine bubbles are sterilized and disinfected by exploding force of the fine bubbles exploding while floating towards the water surface, whereby the raw water filling the treatment container can be converted into portable water.

Although some embodiments have been disclosed herein, it should be understood that various modifications, changes, alterations and equivalent embodiments can be made without departing from the scope of the present invention. Therefore, the scope and sprit of the invention should be defined only by the accompanying claims and equivalents thereof.

The invention claimed is:

1. An apparatus for generating fine bubbles having positive charges, comprising:
    an electrolysis bath having an anode plate and a cathode plate in an interior space, into which a predetermined amount of treated water is supplied, to electrolyze the treated water, wherein the anode plate is formed of iron or aluminum, and wherein the electrolyzed treated water is positively charged by iron ions or aluminum ions produced from the anode plate; and
    a mixing tank, to which the electrolyzed treated water is supplied in a pressurized state by a pump disposed at an intermediate portion of a water feeding pipe extending from the electrolysis bath, and to which air is supplied through an air inflow control valve, the mixing tank being provided therein with a plurality of nozzle blocks separated at constant intervals from each other on an inner surface of the mixing tank, and at least one nozzle hole is formed through each of the nozzle blocks such that a mixture of the treated water and the air passes through the nozzle holes to form fine bubbles,
    wherein the treated water is discharged together with the fine bubbles having positive charges generated during electrolysis through an outlet of the mixing tank;
    and adjacent nozzle blocks of the plurality of nozzle blocks have the at least one nozzle hole formed therethrough in positions that are offset from one another; and
    wherein adjacent nozzle blocks of the plurality of nozzle blocks have differing numbers of the at least one nozzle holes formed therethrough.

2. The apparatus according to claim 1, wherein the nozzle hole is linearly or nonlinearly elongated in a discharge direction such that the mixture of the treated water and the air passing through the nozzle hole generates friction with the nozzle hole.

3. The apparatus according to claim 1, wherein the air inflow control valve is provided to an air inflow pipe connected to a treated water supply pipe to supply the treated water into the electrolysis bath, or provided to an air inflow pipe connected to a water feeding pipe connected to an inlet of the pump.

4. The apparatus according to claim 1, wherein the cathode plate and the anode plate are formed of one material selected from among iron and aluminum.

5. A water treatment apparatus comprising:
the apparatus for generating fine bubbles having positive charges according to claim 1;
a treatment container to which fine bubbles generated by the fine bubble generation apparatus are supplied and in which a predetermined amount of raw water is stored; and
an ultrasonic oscillator generating ultrasound waves having a predetermined intensity upon application of electric power such that the fine bubbles supplied into the treatment container and floating towards a water surface explode,
wherein germs attached to the fine bubbles are sterilized and disinfected by exploding force generated by explosion of the fine bubbles.

6. The water treatment apparatus according to claim 5, wherein the treatment container is connected to a raw water supply pipe having a raw water inflow control valve.

7. The water treatment apparatus according to claim 6, wherein the fine bubble generation apparatus is connected to a circulation pipe connected to the treatment container such that the treatment water sterilized and disinfected in the treatment container is re-circulated and supplied to the fine bubble generation apparatus.

8. The water treatment apparatus according to claim 5, wherein a storage container for receiving treated water sterilized and disinfected in the treatment container and storing a predetermined amount of the treated water is disposed between the fine bubble generation apparatus and the treatment container.

9. The water treatment apparatus according to claim 8, wherein the fine bubble generation apparatus is connected to a raw water storage container storing a predetermined amount of raw water via a treatment water supply pipe, and the treatment water supply pipe is connected to a circulation pipe connected to the treatment container.

10. The water treatment apparatus according to claim 5, wherein the treatment container is provided on a bottom surface thereof with a diffuser connected to a fine bubble supply pipe extending from the fine bubble generation apparatus to supply fine bubbles having positive charges to the treatment container.

11. The water treatment apparatus according to claim 5, wherein the ultrasonic oscillator is disposed at the same height as or at a different height than that of the diffuser such that fine bubbles having positive charges are supplied to the treatment container.

12. The water treatment apparatus according to claim 5, further comprising: a controller controlling an operation timing of the fine bubble generation apparatus to generate fine bubbles having positive charges and an operation timing of the ultrasonic oscillator to generate ultrasound waves to be transferred to the fine bubbles having positive charges.

13. The apparatus according to claim 1, wherein the cathode plate is formed of iron, aluminum, or stainless steel.

* * * * *